United States Patent
Lamirand et al.

(10) Patent No.: US 10,012,126 B2
(45) Date of Patent: Jul. 3, 2018

(54) RESERVOIR ASSEMBLY

(71) Applicant: MGI COUTIER, Champfromier (FR)

(72) Inventors: Yves Lamirand, Bourg de Péage (FR); Christophe Bondran, Saint Uze (FR)

(73) Assignee: MGI COUTIER, Champfromier (FR)

( * ) Notice: Subject to any disclaimer, the term of this patent is extended or adjusted under 35 U.S.C. 154(b) by 69 days.

(21) Appl. No.: 15/202,843

(22) Filed: Jul. 6, 2016

(65) Prior Publication Data

US 2017/0009631 A1    Jan. 12, 2017

(30) Foreign Application Priority Data

Jul. 10, 2015   (FR) ..................................... 15 56614

(51) Int. Cl.
| | |
|---|---|
| *F01N 3/00* | (2006.01) |
| *F01N 3/28* | (2006.01) |
| *B60K 15/04* | (2006.01) |
| *F01N 3/20* | (2006.01) |
| *F01N 11/00* | (2006.01) |
| *B60K 15/03* | (2006.01) |

(52) U.S. Cl.
CPC ............ *F01N 3/2896* (2013.01); *B60K 15/03* (2013.01); *B60K 15/04* (2013.01); *F01N 3/20* (2013.01); *F01N 11/00* (2013.01); *B60K 2015/03217* (2013.01); *B60K 2015/03493* (2013.01); *F01N 2610/02* (2013.01)

(58) Field of Classification Search
CPC .......... B60K 15/03; B60K 2015/03217; B60K 2015/03493; B60K 15/04; F01N 3/2896; F01N 2610/02; F01N 11/00; F01N 3/20
See application file for complete search history.

(56) References Cited

U.S. PATENT DOCUMENTS

| | | | | |
|---|---|---|---|---|
| 6,155,448 | A * | 12/2000 | Ishikawa ................ | B60K 15/03 220/562 |
| 9,074,610 | B2 * | 7/2015 | Harr ....................... | F01N 3/2066 |
| 2001/0054446 | A1 * | 12/2001 | Reiter .................. | B60K 15/035 137/587 |
| 2012/0311999 | A1 * | 12/2012 | Hodgson ............... | F01N 3/2066 60/295 |
| 2012/0315196 | A1 * | 12/2012 | Maus .................... | F01N 3/2066 422/174 |
| 2013/0000743 | A1 | 1/2013 | Crary | |
| 2013/0263941 | A1 * | 10/2013 | Landes ................. | F01N 3/2066 137/351 |

FOREIGN PATENT DOCUMENTS

| | | | |
|---|---|---|---|
| DE | 102012020039 A1 * | 4/2014 | .......... F01N 3/2066 |
| EP | 2708710 A2 | 3/2014 | |
| WO | 2014/037210 A1 | 3/2014 | |

* cited by examiner

*Primary Examiner* — Craig Schneider
*Assistant Examiner* — Angelisa L Hicks
(74) *Attorney, Agent, or Firm* — Oliff PLC

(57) ABSTRACT

This reservoir assembly includes a reservoir, a liquid supply module of a downstream pipe, and a level sensor. The bottom has a first protruding portion, for housing the supply module, and a second protruding portion for defining a passage housing the downstream pipe. The level sensor is located in the housing. The bottom further has an upper area and a lower area adjacent to the housing. The upper area is defined by a top portion of the passage. The lower area is located lower than the upper area. The level sensor is in the housing at the same altitude as the lower area.

13 Claims, 5 Drawing Sheets

RESERVOIR ASSEMBLY

The present invention concerns a reservoir assembly for storing a liquid in a motor vehicle. The liquid may for example be an urea aqueous solution.

The present invention applies to the field of reservoir assemblies comprising a supply module for pumping the liquid outside the reservoir and for transporting it to a downstream pipe. In particular, the present invention may apply to the field of motor vehicles comprising such a reservoir assembly. More particularly, the present invention may apply to a reservoir assembly for urea aqueous solution, such as a solution called by the trade mark AdBlue™. Motor vehicle means, in particular, passenger vehicles, utility vehicles or industrial vehicles for example of the truck type.

US2013000743A1 describes a reservoir assembly comprising a reservoir and a supply module. The reservoir has a bottom having i) a portion protruding inwardly of the reservoir for housing the supply module. The reservoir assembly further comprises a liquid level sensor located in the reservoir.

However, as the level sensor is immersed in the liquid of the reservoir, it undergoes chemical attacks due to the liquid. Moreover, the reservoir assemblies of the state of the art often have a downstream pipe and a fluid fitting arranged lower than the bottom of the reservoir. Such an arrangement reduces the useful volume of the reservoir, because the reservoir must be inserted into a predetermined space, which limits the dimensions of the reservoir.

Furthermore, such an assembly comprises a downstream pipe to lead the liquid downstream of the reservoir and of the supply module. But such a downstream pipe and its fluid fitting are generally disposed under the reservoir, which reduces the useful volume of the reservoir, because neither the downstream pipe nor its fluid fitting nor any component of the reservoir assembly must be located under the minimum height defined by the ground clearance of the motor vehicle. Indeed, the ground clearance is the minimum height to be respected between a level ground and any component of the motor vehicle. The space delimited by the ground clearance must be free of any component of the motor vehicle, except for the wheels.

The present invention aims, in particular, at solving, in whole or part, the problems mentioned hereinabove.

To this aim, the present invention relates to a reservoir assembly for storing a liquid, for example an urea aqueous solution, in a motor vehicle, the reservoir assembly comprising:
  i) a reservoir configured to contain the liquid,
  ii) a supply module configured to dispense the liquid from the reservoir to a downstream pipe, and
  iii) a level sensor configured to generate signals representative of the liquid level in the reservoir,
  the reservoir having a bottom having:
    a first protruding portion which protrudes inwardly of the reservoir and which is configured to define a housing, the supply module being housed at least partially in the housing, and
    a second protruding portion which protrudes inwardly of the reservoir and which is configured to define a passage, the passage being connected to the housing, the passage being intended for housing at least the downstream pipe;
  the reservoir assembly being characterized in that the level sensor is located in the housing, and in that the bottom further has an upper area and a lower area which are adjacent to the first protruding portion, the upper area being defined by an upper portion of the passage, the lower area being located lower than the upper area when the reservoir assembly is in the operating configuration, the level sensor being arranged in the housing and substantially at the same height as the lower area.

Thus, the upper area allows housing the downstream pipe and a fluid connector in order to join the downstream pipe to the supply module above the ground clearance. Furthermore, the upper area allows housing, if required, an electrical cable and an electrical connector above the ground clearance.

In other words, the downstream pipe, the fluid connector, the electrical cable and the electrical connector does not encroach on the ground clearance. During the assembly of the reservoir assembly, the upper area allows an operator to pass his hand until the location of the fluid connector and the electrical connection, so as to join and connect the supply module to the downstream pipe and to the electrical cable.

Furthermore, the lower area allows placing a level sensor facing the liquid as low as possible. Then the lower area allows maximizing the useful volume of the reservoir, because it allows minimizing the non-measurable or non-jaugeable volume extending below the level sensor.

Throughout the present application, an altitude is measured along a vertical direction when the reservoir assembly is in the operating configuration. An altitude may be measured with respect to a reference plane (RP) of the motor vehicle, this reference plane being horizontal when the motor vehicle is laid on a level ground.

Since the level sensor is located in the housing, the level sensor is located outside the reservoir, thereby avoiding its deterioration by the liquid contained in the reservoir. According to a variant, the level sensor comprises Hall effect cells configured to detect a float located at the surface of the liquid when the reservoir assembly is operating.

According to a variant, the bottom has a bottom opening configured for the passage of a liquid pipe within the reservoir to the outside of the reservoir.

According to one embodiment, the reservoir assembly further comprises a seal arranged between the supply module and a sealing surface defined by the bottom, the sealing surface extending from the upper area to the lower area so that the sealing surface has at least one inclined portion with respect to a reference plane configured to extend substantially to the altitude of the ground clearance when the reservoir assembly is operating.

Thus, the sealing surface and the seal allow delimiting a dry zone for the components of the supply module.

As the sealing surface has a inclined portion, this sealing surface has, at least locally, a constant orientation. This constant orientation allows obtaining an effective and lasting sealing, because the seal bears against the sealing surface without changing orientation.

Furthermore, the inclination of the sealing surface allows reducing the altitude of the lowest point for the measurement of the liquid level, the level sensor being located opposite to the liquid present in the reservoir.

Since the reference plane is configured to extend to the altitude of the ground clearance, the reference plane is horizontal when the reservoir assembly is operating.

According to one embodiment, the sealing surface is generally flat and totally inclined from the upper area to the lower area.

In other words, the sealing surface is continuously inclined. Thus, the flat sealing surface contributes to carry out a reliable watertight connection, because the seal may be compressed in a single direction, thereby uniformly mastering the compression of the seal.

According to one embodiment, the sealing surface is inclined at an inclination angle comprised between 0 degrees and 30 degrees with respect to the reference plane.

Thus, such an inclination angle allows minimizing the altitude of the lowest point for the measurement of the liquid level, while defining an upper area and a passage for housing the downstream pipe and the fluid connector.

According to one embodiment, the sealing surface has generally the shape of a flat ring, for example with a circular base.

Thus, such an annular and flat sealing surface contributes to carry out a reliable watertight connection, because the seal may be uniformly compressed.

According to a variant, the annular sealing surface has a curvilinear base, for example circular. Alternatively to this variant, the annular sealing surface has a polygonal base, for example rectangular.

According to one embodiment, the supply module further comprises a platen configured to accommodate components belonging to the supply module, the platen having an upper sealing surface arranged so as to accommodate the seal.

Thus, such a platen facilitates the assembly of the reservoir assembly, in particular of the seal.

According to a variant, the upper sealing surface is formed by a groove configured to house at least partially the seal.

According to one embodiment, the altitude difference between the upper area and the lower area is comprised between 5 mm and 55 mm.

Thus, such an altitude difference allows, on the one hand, housing the downstream pipe and the fluid connector and, on the other hand, placing the level sensor as low as possible, that is to say right above certain components of the supply module, in particular its electronic circuit.

According to one embodiment, the bottom further has a lower portion intended to be located at a minimum altitude when the reservoir is in the operating configuration, the lower area being located at an altitude comprised between 5 mm and 25 mm above the lower portion.

Thus, this altitude of the lower area allows, in particular, placing components of the supply module under the lower area. In a motor vehicle, the minimum altitude is determined by the ground clearance.

According to a variant, the low area is lower than the bottom opening where the reservoir is joined to the supply module.

According to one embodiment, the first protruding portion extends higher than the second protruding portion.

In other words, the first protruding portion is located higher than the second protruding portion; then the altitude of the first protruding portion is greater than the altitude of the second protruding portion.

Thus, the first protruding portion can house a level sensor measuring the liquid level over a relatively large height. Furthermore, the height of the second protruding portion may be limited to the minimum required for housing the fluid connector and for reaching and manipulating the fluid connector and the electrical connector.

The height of the first and the second protruding portions is measured with respect to the lowest point of the bottom when the reservoir assembly is in the operating configuration.

According to one embodiment, the first protruding portion extends over a height comprised between 20 mm and 200 mm.

Thus, such a height allows the housing to house the supply module with all its components above the ground clearance.

According to a variant, the housing comprises at least two zones which have different heights, the heights of the zones being adjusted to the size of the components of the supply module to be housed respectively in these zones. For example, a first zone may house the level sensor and a second zone may house the accumulator and/or the pump.

Thus, the first zone may have a relatively large height in order to measure the liquid level over a large height in the reservoir, while the second zone may have the minimum height for housing the accumulator and/or the pump. Thus, these different and adjusted heights of the zones of the housing allow maximizing the useful volume of the reservoir.

According to one embodiment, the second protruding portion extends over a height comprised between 10 mm and 60 mm.

Thus, such a height allows the passage to house the downstream pipe and the fluid connector above the ground clearance, and this height allows an operator to join the downstream pipe by passing his hand through the passage.

According to one embodiment, the bottom is formed by an integral wall resulting from moulding by injection of a plastic material.

A bottom thus manufactured, can have a complex, thus optimized geometry, and a reduced cost.

According to one embodiment, the supply module further comprises an electronic circuit configured to accommodate the signals generated by the level sensor, the electronic circuit extending in the lower area when the reservoir assembly is in the operating configuration.

Thus, such an electronic circuit allows, in particular, accommodating, processing and transmitting the measurement signals generated by the level sensor. The electronic circuit may be configured to meet other electrical and/or electronic functions.

According to a variant, the level sensor and the supply module are connected when the reservoir assembly is in the operating configuration.

According to one embodiment, the reservoir assembly further comprises a fluid connector configured to join the supply module to the downstream pipe and the reservoir assembly further comprises an electrical connector configured to connect the supply module to an electrical cable, the fluid connector and the electrical connector being housed in the passage.

Thus, such an electrical cable allows electrically supplying the components of the supply module. The electrical cable may comprise an electrical power pipe and, if required, an electrical signal pipe, respectively, for supplying for example a pump belonging to the supply module and for transmitting the measurements made by a level sensor located in the housing.

Furthermore, the present invention relates to a motor vehicle comprising such a reservoir assembly.

The embodiments and the aforementioned variants may be taken alone or in any technically possible combination.

The present invention will be well understood and its advantages will also appear in the light of the following description, given only by way of non-limiting example and with reference to the appended schematic figures, in which identical reference signs correspond to structurally and/or functionally identical or similar elements. In the appended schematic figures:

FIGS. 1, 2, 3, 4 and 5 illustrate a reservoir assembly 1, for storing a liquid, herein an urea aqueous solution, in a not shown motor vehicle.

Figure 1:
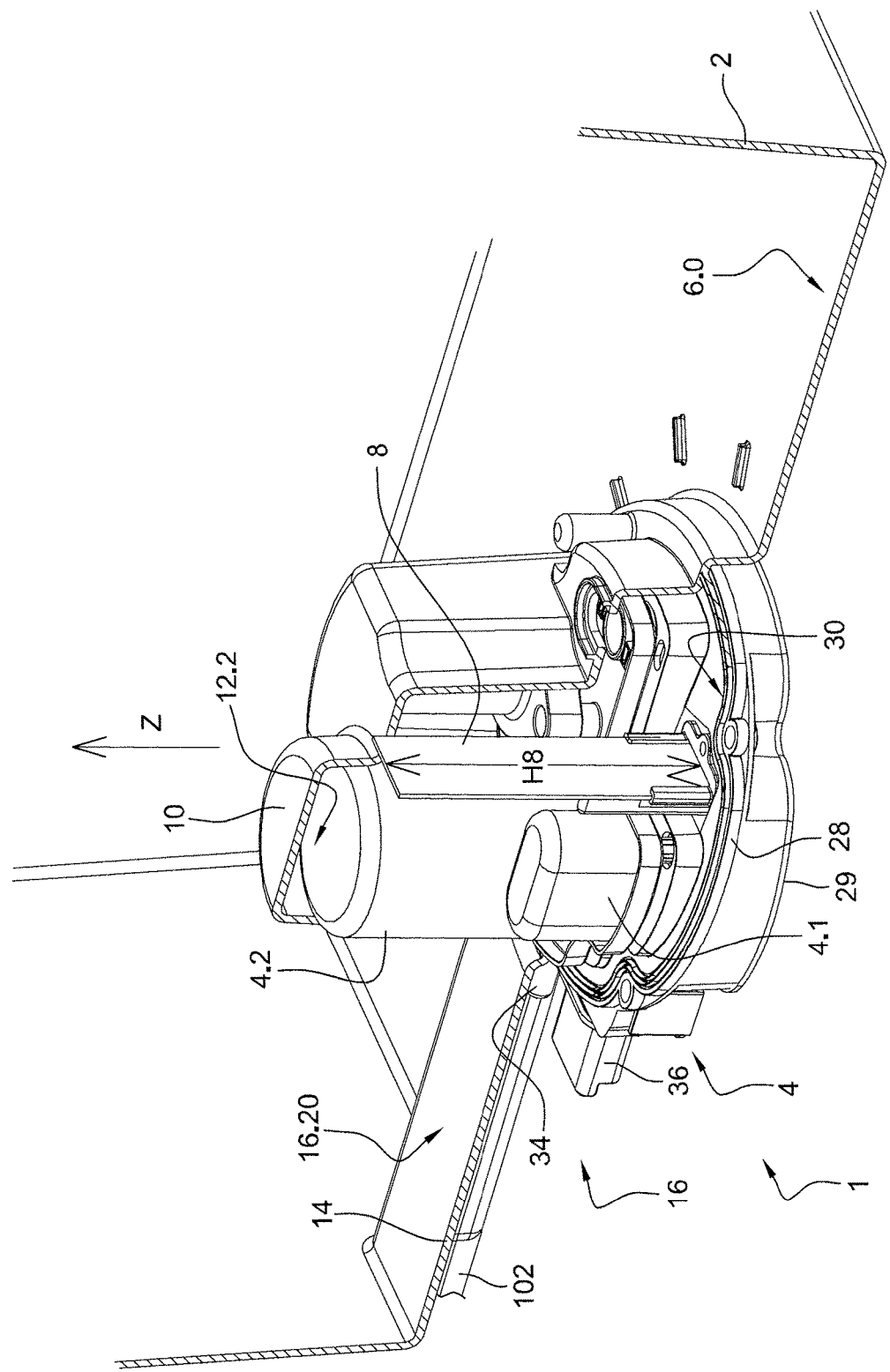
FIG. 1 is a truncated perspective view of a reservoir assembly in accordance with the invention.
Figure 2:
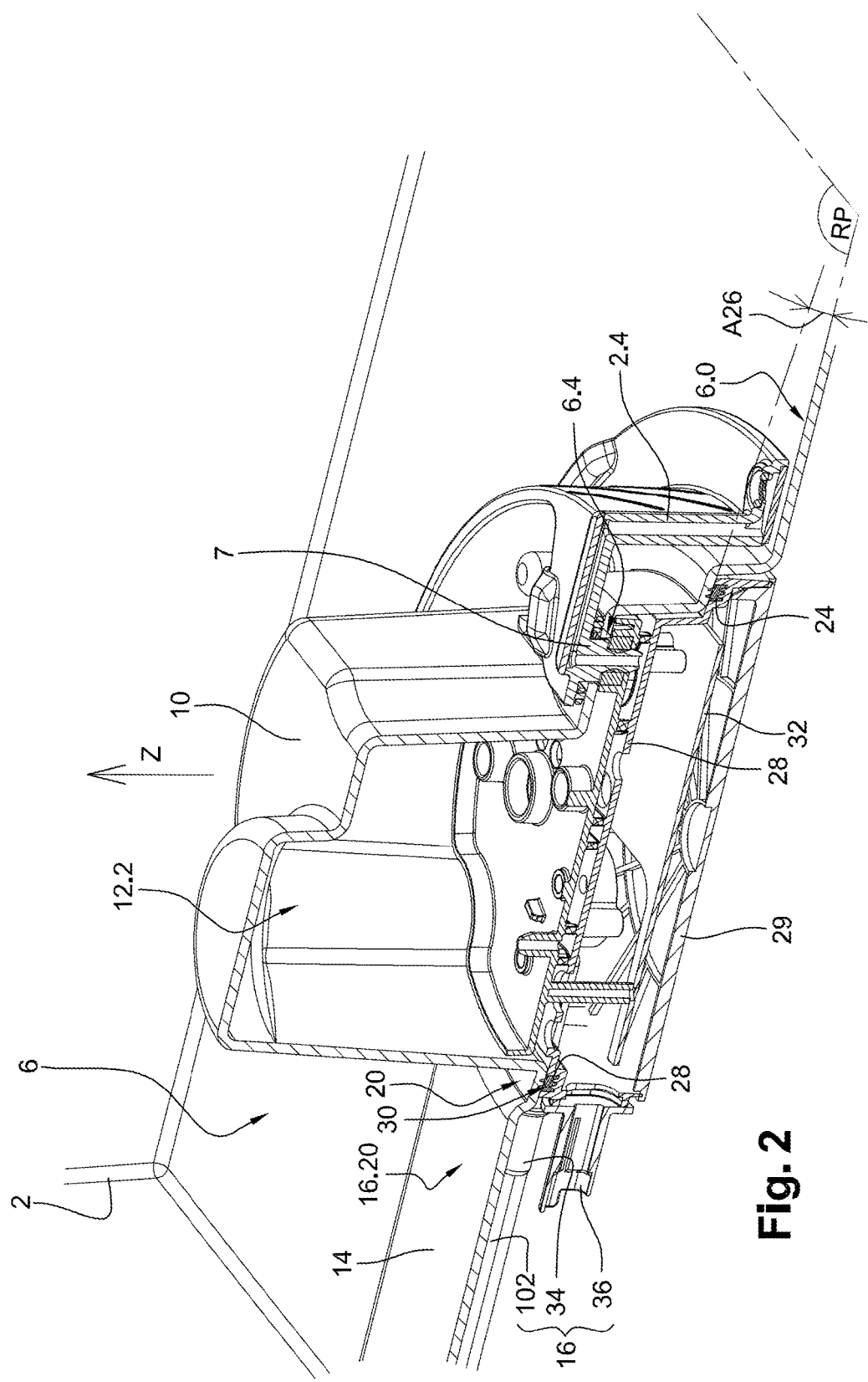
FIG. 2 is a truncated perspective view by a first vertical plane of a part of the reservoir assembly of FIG. 1.
Figure 3:
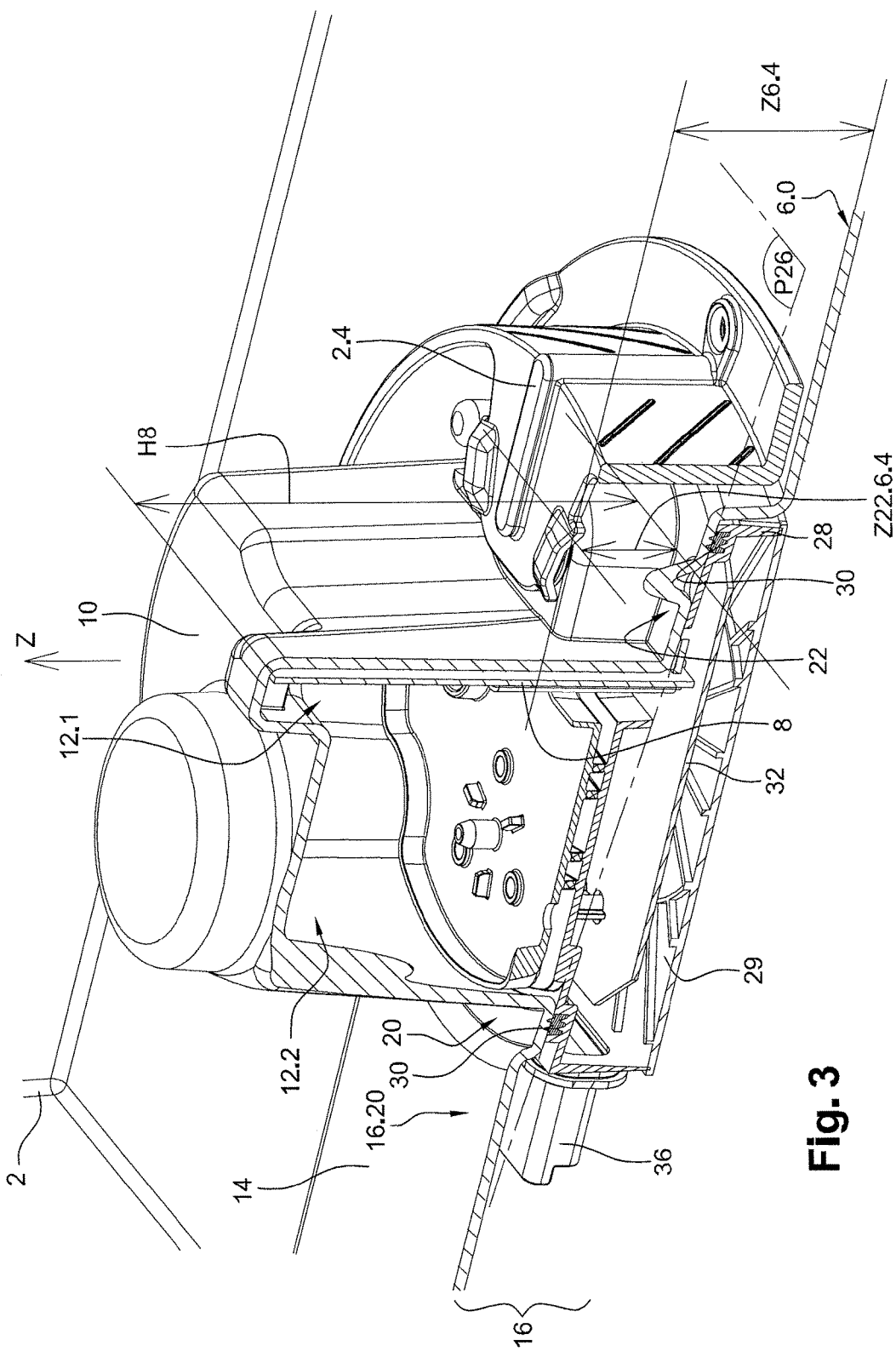
FIG. 3 is a truncated perspective view by a second vertical plane of a part of the reservoir assembly of FIG. 1.
Figure 4:
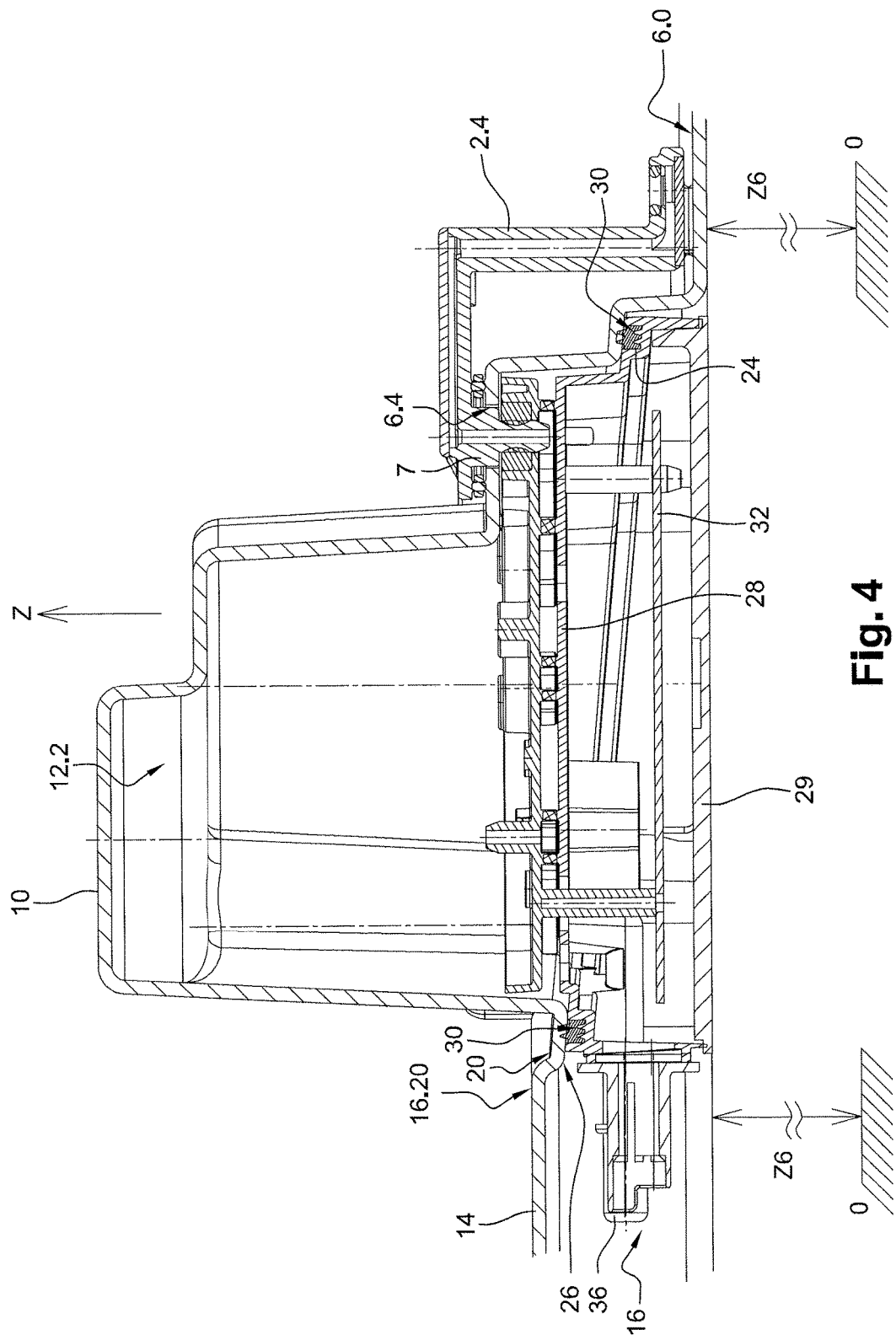
FIG. 4 is a section through the first vertical plane.
Figure 5:
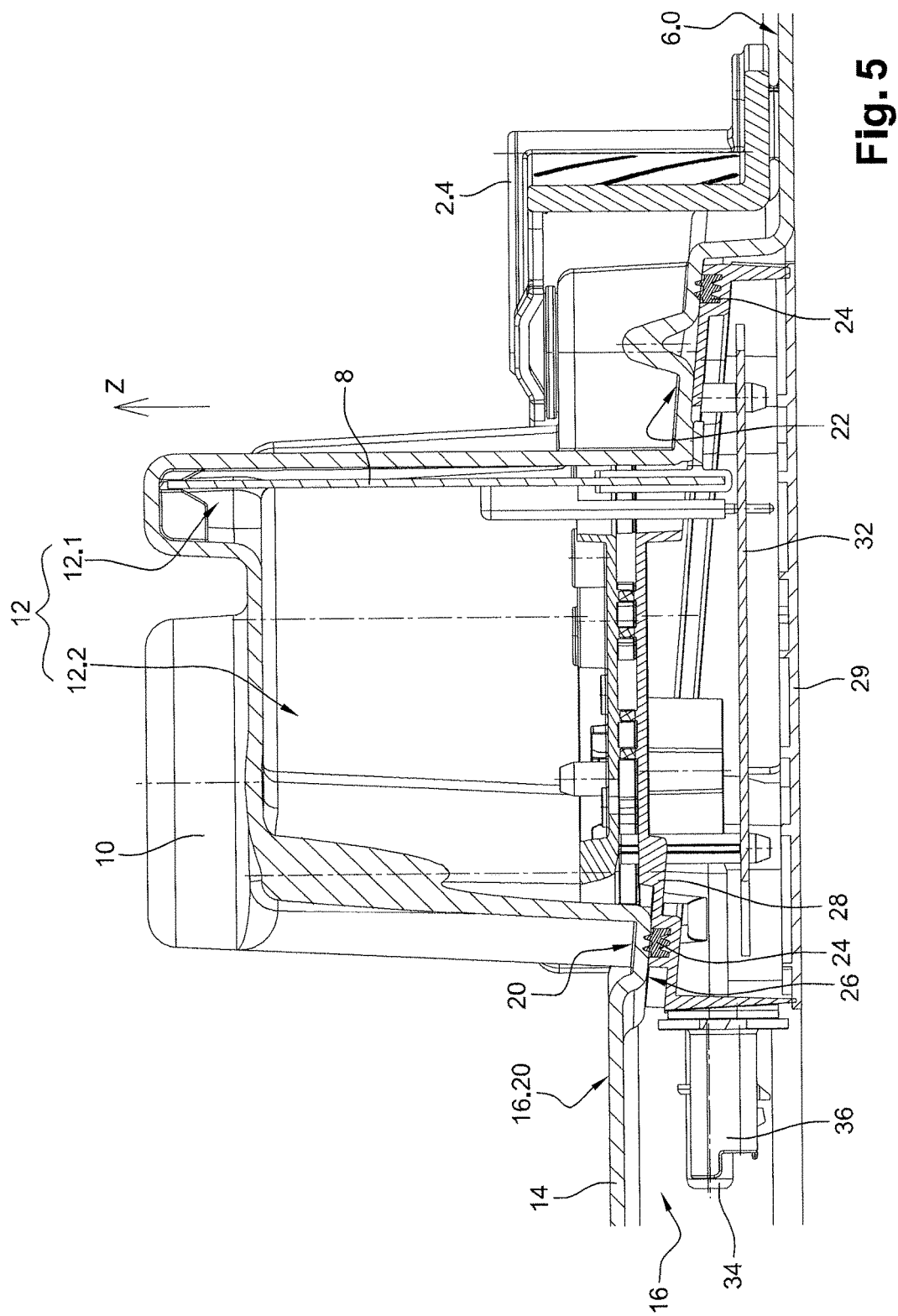
FIG. 5 is a section through the second vertical plane.

The reservoir assembly 1 comprises a reservoir 2 and a supply module 4. The reservoir 2 is configured to contain the liquid. The supply module 4 configured to dispense the liquid from the reservoir 2 to a downstream pipe 102. When the reservoir assembly 1 is operating, the downstream pipe 102 leads the liquid to a member which consumes the liquid, by a not shown injector.

The supply module 4 herein comprises a pump 4.1 and an accumulator 4.2. The supply module 4 is fluidly connected to the inside of the reservoir 2 by means of a transfer device 2.4. The pump 4.1 is configured to pump the liquid in the reservoir 2. The accumulator 4.2 is configured to accumulate the pressurized liquid and then to dispense the liquid depending on the pressure of the liquid in the supply module 4.

The reservoir assembly 1 further comprises a level sensor 8 which is configured to generate signals representative of the liquid level in the reservoir 2. The level sensor 8 is located in the housing 12.

The housing 12 herein comprises a first zone 12.1 and a second zone 12.2 which have different heights. The height of each of the first 12.1 and the second 12.2 zones is adjusted to the size of one or more component(s) of the supply module 1 to be housed in this first 12.1 or second 12.2 zone.

The first zone 12.1 houses the level sensor 8 and the second zone 12.2 houses the accumulator 4.2. The first zone 12.1 may have a relatively large height in order to measure the liquid level over a large height in the reservoir 2. The second zone 12.2 may have the minimum height to house the accumulator 4.2. Thus, these different heights of the first 12.1 and the second 12.2 zones of the housing 12 allow maximizing the useful volume of the reservoir 2.

The level sensor 8 has a height H8 dimensioned for measuring the liquid level on a relatively wide range. Thus, the level sensor 8 extends over the major part of the housing 12 along a vertical direction Z when the reservoir assembly is in the operating configuration. The level sensor 8 herein comprises Hall effect cells configured to detect a float located on the surface of the liquid when the reservoir assembly 1 is operating.

The reservoir 2 has a bottom 6 having a first protruding portion 10 and a second protruding portion 14. The first protruding portion 10 and the second protruding portion 14 protrude inwardly of the reservoir 2.

The bottom 6 is formed by an integral wall resulting from moulding by injection of a plastic material, possibly reinforced with fibers, for example glass fibers. The reservoir may be generally composed of a lower half-shell, partially visible in the upper part of FIG. 1, and a not shown upper half-shell. The bottom 6 may be integral (one piece) with the lower half-shell.

The bottom 6 has a lower portion 6.0 which generally extends at a minimum altitude when the reservoir 2 is in the operating configuration. In order to maximize the liquid volume contained in the reservoir 2, the lower portion 6.0 occupies the largest possible area of the bottom 6. The lower portion 6.0 is intended to be located right above the altitude of the ground clearance Z6.

The bottom 6 further has a bottom opening 6.4 configured for the passage of a liquid pipe 7 from the inside of the reservoir 2 to the outside of the reservoir 2, then to the supply module 4. When the reservoir assembly 1 is operating, the liquid flows from the reservoir 2 to the supply module 4 through the liquid pipe 7, which extends through the bottom opening 6.4.

The first protruding portion 10 is configured to define a housing 12. When the reservoir assembly 1 is assembled, the supply module 4 is herein mainly housed in the housing 12. The second protruding portion 14 is configured to define a passage 16 which is connected to the housing 12. When the reservoir assembly 1 is assembled, the passage 16 completely houses (in height) an end portion of the downstream pipe 102.

The bottom 6 also has an upper area 20 and a lower area 22. The upper area 20 and the lower area 22 extend higher than the lower portion 6.0 of the bottom 6.

The lower area 22 is located lower than the upper area 20 when the reservoir assembly 1 is in the operating configuration. The upper area 20 may be located at an altitude comprised between 10 mm and 60 mm above the lower portion 6.0. The lower area 22 may be located at an altitude comprised between 5 mm and 25 mm above the lower portion 6.0. The altitude difference between the upper area 20 and the lower area 22 may be comprised between 5 mm and 55 mm.

Similarly, the first protruding portion 10 extends higher than the second protruding portion 14 with respect to the lower portion 6.0 of the bottom 6. The first protruding portion 10 may extend over a height comprised between 20 mm and 200 mm. The second protruding portion 14 extends over a height comprised between 10 mm and 60 mm.

In the example of the figures, the lower area 22 is lower than the bottom opening 6.4 where the reservoir 2 is joined to the supply module 4. The bottom opening 6.4 is located at a height Z6.4 approximately equal to 60 mm. The altitude difference Z22.6.4 between the lower area 22 and the bottom opening 6.4 may be comprised between 5 mm and 70 mm.

Since the passage 16 communicates with the housing 12, the upper area 20 is adjacent to the first protruding portion 10. Similarly, the lower area 22 is adjacent to the first protruding portion 10. The upper area 20 is defined by an upper part 16.20 of the passage 16.

The level sensor 8 is arranged in the housing 12 and substantially at the same height as the lower area 22, in order to measure the liquid level in the reservoir 2 and as close as possible to the lower portion 6.0 of the bottom 6.

The reservoir assembly 1 further comprises a seal 24 arranged between the supply module 4 and a sealing surface 26 defined by the bottom 6. The seal 24 has the function of carrying out a sealing between the reservoir 2 and the supply module 4, so as to delimit a dry zone where to put the components of the supply module 4, in particular the electrical or electronic components.

The sealing surface 26 extends from the upper area 20 to the lower area 22. In the example of the figures, the sealing surface 26 is generally flat. The sealing surface 26 extends in a plane P26. The sealing surface 26 is herein completely inclined with respect to a reference plane RP. The reference plane RP extends substantially to the altitude of the ground clearance Z6 when the reservoir assembly 1 is operating. The sealing surface 26 has herein generally the shape of a flat ring with a circular base.

The sealing surface 26 and its plane P26 are herein inclined at an inclination angle A26 which may be comprised between 0 degrees and 30 degrees, for example approximately equal to 5 degrees with respect to the reference plane RP. Since the sealing surface 26 is flat, it has herein a constant inclination angle A26 with respect to the reference plane RP, regardless of the point of the sealing surface 26 where the inclination angle A26 is measured.

Moreover, the supply module 4 further comprises a platen 28, which is configured to accommodate components belonging to the supply module 4.

The platen 28 has an upper sealing surface 30. The upper sealing surface 30 is arranged so that the seal 24 bears against the upper sealing surface 30. The upper sealing surface 30 is herein formed by a groove which is formed on the platen 28 and which is configured to house almost completely the seal 24.

Furthermore, the supply module 4 further comprises a cover 29, which is configured to close the space beneath the platen 28. The cover 29 is secured to the platen 28.

Furthermore, the supply module 4 comprises an electronic circuit 32, which is in particular configured to accommodate the signals generated by the level sensor 8. The electronic circuit 32 extends under the lower area 22 when the reservoir assembly 1 is in the operating configuration. The electronic circuit 32 extends herein between the platen 28 and the cover 29.

The reservoir assembly 1 further comprises a fluid connector 34, which is configured to join the supply module 4 to the downstream pipe 102 when the reservoir assembly 1 is in the operating configuration. The reservoir assembly 1 further comprises an electrical connector 36 which is configured to connect the supply module 4 to an electrical cable when the reservoir assembly 1 is in the operating configuration. The fluid connector 34 and the electrical connector 36 are housed in the passage 16.

When the reservoir assembly 1 is operating, the liquid flows from the reservoir 2 to the supply module 4 via the bottom opening 6.4 and through the liquid pipe 7. Then, the pump 4.1 belonging to the supply module 4 displaces the liquid to the downstream pipe 102. The downstream pipe 102 leads the liquid to a not shown member which consumes the liquid, herein an injector.

As and when the injector consumes liquid, the liquid level decreases in the reservoir 2. The level sensor 8 measures the liquid level from the altitude of the lower area 22.

When the liquid level reaches the altitude of the lower area 22, an alert signal is generated to alert the user that the reservoir 2 does not contain enough liquid for supplying the injector. At this time, it remains a little liquid in the reservoir 2 between the lower portion 6.0 and the lower area 22. But this volume is non-measurable or non-jaugeable, since it is located below the altitude of the level sensor 8.

Of course, the present invention is not limited to the particular embodiments described in this patent application, or to the embodiments within the scope of those skilled in the art. Other embodiments may be considered without departing from the scope of the invention, from any element equivalent to an element specified in the present application.

The invention claimed is:

1. A reservoir assembly for storing a liquid, for example an urea aqueous solution, in a motor vehicle, the reservoir assembly comprising:
   i. a reservoir configured to contain the liquid,
   ii. a supply module configured to dispense the liquid from the reservoir to a downstream pipe, and
   iii. a level sensor configured to generate signals representative of the liquid level in the reservoir,
   the reservoir having a bottom having:
   a first protruding portion which protrudes inwardly of the reservoir and which is configured to define a housing, the supply module being housed at least partially in the housing, and
   a second protruding portion which protrudes inwardly of the reservoir and which is configured to define a passage, the passage being connected to the housing, the passage being intended for housing at least the downstream pipe;
   wherein the level sensor is located in the housing, and in that the bottom further has an upper area and a lower area which are adjacent to the first protruding portion, the upper area being defined by an upper portion of the passage, the lower area being located lower than the upper area when the reservoir assembly is in the operating configuration, the level sensor being arranged in the housing, and at least a portion of the level sensor being arranged at the same height as the lower area, and
   wherein the reservoir assembly further comprises a seal arranged between the supply module and a sealing surface defined by the bottom, the sealing surface extending from the upper area to the lower area so that the sealing surface has at least one inclined portion with respect to a reference plane configured to extend to the height of a ground clearance when the reservoir assembly is operating.

2. The reservoir assembly according to claim 1, wherein the sealing surface is generally flat and completely inclined from the upper area to the lower area.

3. The reservoir assembly according to claim 1, wherein the sealing surface is inclined at an inclination angle comprised between 0 degrees and 30 degrees with respect to the reference plane.

4. The reservoir assembly according to claim 1, wherein the sealing surface generally has the shape of a flat ring, for example with a circular base.

5. The reservoir assembly according to claim 1, wherein the supply module further comprises a platen configured to accommodate components belonging to the supply module, the platen having an upper sealing surface arranged so as to receive the seal.

6. The reservoir assembly according to claim 1, wherein an altitude difference between the upper area and the lower area is comprised between 5 mm and 55 mm.

7. The reservoir assembly according to claim 1, wherein the bottom further has a lower portion intended to be located at a minimum altitude when the reservoir is in operating configuration, the lower area being located at an altitude comprised between 5 mm and 25 mm above the lower portion.

8. The reservoir assembly according to claim 1, wherein the first protruding portion extends higher than the second protruding portion.

9. The reservoir assembly according to claim 1, wherein the first protruding portion extends over a height comprised between 20 mm and 200 mm.

10. The reservoir assembly according to claim 1, wherein the second protruding portion extends over a height comprised between 10 mm and 60 mm.

11. The reservoir assembly according to claim 1, wherein the bottom is formed by an integral wall resulting from molding by injection of a plastic material.

12. The reservoir assembly according to claim 1, wherein the supply module further comprises an electronic circuit configured to accommodate the signals generated by the level sensor, the electronic circuit extending under the lower area when the reservoir assembly is in operating configuration.

13. The reservoir assembly according to claim 12, further comprising a fluid connector configured to connect the supply module to the downstream pipe, the reservoir assembly further comprising an electrical connector configured to connect the supply module to an electrical cable, the fluid connector and the electrical connector being housed in the passage.

* * * * *